(12) United States Patent
Okuda et al.

(10) Patent No.: US 10,816,251 B2
(45) Date of Patent: Oct. 27, 2020

(54) HEAT PUMP

(71) Applicant: Yanmar Co., Ltd., Osaka-shi, Osaka-fu (JP)

(72) Inventors: Norihiro Okuda, Osaka (JP); Hirotoshi Kihara, Osaka (JP); Keisuke Ota, Osaka (JP); Terunori Aikawa, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

(21) Appl. No.: 15/559,011

(22) PCT Filed: Mar. 11, 2016

(86) PCT No.: PCT/JP2016/057838
§ 371 (c)(1),
(2) Date: Sep. 15, 2017

(87) PCT Pub. No.: WO2016/148077
PCT Pub. Date: Sep. 22, 2016

(65) Prior Publication Data
US 2018/0080697 A1 Mar. 22, 2018

(30) Foreign Application Priority Data
Mar. 17, 2015 (JP) .................. 2015-053176

(51) Int. Cl.
*F25B 13/00* (2006.01)
*F25B 49/02* (2006.01)

(52) U.S. Cl.
CPC ............ *F25B 49/027* (2013.01); *F25B 13/00* (2013.01); *F25B 49/02* (2013.01);
(Continued)

(58) Field of Classification Search
CPC ........ Y02B 30/52; F25B 49/027; F25B 13/00; F25B 1/00; F25B 2600/2515;
(Continued)

(56) References Cited

U.S. PATENT DOCUMENTS 3,977,205 A * 8/1976 Dreisziger ................ F25B 5/02
62/117
4,498,310 A * 2/1985 Imanishi .................. F25B 13/00
236/92 B
(Continued)

FOREIGN PATENT DOCUMENTS

CN 202304166 U 7/2012
CN 102853583 A 1/2013
(Continued)

OTHER PUBLICATIONS

Tanawittayakorn et al., Heat Pump Efficiency Improvement by Discharge Superheat Control, 2012, Purdue University (Year: 2012).*
(Continued)

*Primary Examiner* — Elizabeth J Martin
*Assistant Examiner* — Chang H Park
(74) *Attorney, Agent, or Firm* — Norton Rose Fulbright US LLP

(57) ABSTRACT

An exemplary heat pump includes: a compressor configured to compress a refrigerant; a first heat exchanger configured to condense the compressed refrigerant; a flow rate adjustment valve configured to adjust a flow rate of the condensed refrigerant; an expansion valve having an adjustable opening and configured to decompress the refrigerant having passed the flow rate adjustment valve; a second heat exchanger configured to cool a temperature control target by using the refrigerant decompressed by the expansion valve; and a control device configured to control the opening of the expansion valve based on a difference between the tempera-
(Continued)

ture of the refrigerant flowing into the second heat exchanger and the temperature of the refrigerant flowing out from the second heat exchanger, and to control the opening of the flow rate adjustment valve based on the flow rate of the refrigerant to be supplied to the second heat exchanger.

20 Claims, 1 Drawing Sheet

(52) U.S. Cl.
CPC . *F25B 2313/005* (2013.01); *F25B 2313/0233* (2013.01); *F25B 2313/0314* (2013.01); *F25B 2600/17* (2013.01); *F25B 2600/2513* (2013.01); *F25B 2600/2515* (2013.01); *F25B 2700/1933* (2013.01); *F25B 2700/21151* (2013.01); *Y02B 30/52* (2013.01)

(58) Field of Classification Search
CPC .......... F25B 2600/2513; F25B 2600/17; F25B 2700/1933; F25B 2400/075; F25B 2309/002; F25B 2313/005; F25B 2313/0233; F25B 2313/0314; F25B 2341/0661; F25B 2400/053; F25B 2700/2108; F25B 2700/171; F25J 2230/24
USPC .......................................................... 62/208
See application file for complete search history.

(56) References Cited

U.S. PATENT DOCUMENTS

| | | | | |
|---|---|---|---|---|
| 4,766,735 A * | 8/1988 | Gotou | ....................... | F25B 5/00 165/207 |
| 5,353,604 A * | 10/1994 | Oguni | ..................... | F25B 9/006 62/207 |
| 6,233,955 B1 * | 5/2001 | Egara | ...................... | F25B 41/04 62/185 |
| 8,578,725 B2 * | 11/2013 | Nishimura | ............ | F25B 49/005 62/149 |
| 2009/0100849 A1 * | 4/2009 | Nishimura | .............. | F25B 45/00 62/149 |
| 2011/0132011 A1 * | 6/2011 | Kojima | ................. | F25B 49/027 62/180 |
| 2013/0152613 A1 * | 6/2013 | Yamashita | .............. | F25B 9/006 62/129 |
| 2014/0345307 A1 * | 11/2014 | Bagley | .................... | F25B 49/02 62/115 |

FOREIGN PATENT DOCUMENTS

| | | | |
|---|---|---|---|
| CN | 103307825 A | 9/2013 | |
| EP | 0586193 A1 | 3/1994 | |
| EP | 1477748 A1 * | 11/2004 | .............. F25B 13/00 |
| EP | 2320151 A1 | 5/2011 | |
| JP | 63-034459 A | 2/1988 | |
| JP | S63-034459 A | 2/1988 | |
| JP | 02-064361 A | 3/1990 | |
| JP | H4-20749 A | 1/1992 | |
| JP | 04-366365 A | 12/1992 | |
| JP | H05-093547 A | 4/1993 | |

OTHER PUBLICATIONS

Tomczyk, Understanding Superheat, Jun. 3, 2004, The News (Year: 2004).*
Illes et al., Pressure and Temeprature Drop in Gas Transporting Pipelines, 2012, Advnaced Logistic Systems vol. 6. No. 1. pp. 159-166 (Year: 2012).*
Henry Technology, The Role of the Suction Line Accumulator, Aug. 29, 2001 (Year: 2001).*
John Tomczyk, Selecting, Installing Oil Separators, Oct. 29, 2003, the News (Year: 2003).*
International Search Report dated May 31, 2016 issued in corresponding PCT Application PCT/US2018/057838.
Korean Office Action dated Jan. 21, 2019 issued in corresponding Korean Application No. 10-2017-7025595.
European Search Report dated Oct. 8, 2018 issued in corresponding European Application No. 16764907.8.
Chinese Office Action dated Aug. 21, 2019 issued in corresponding Chinese Application No. 201680007055.2.

* cited by examiner

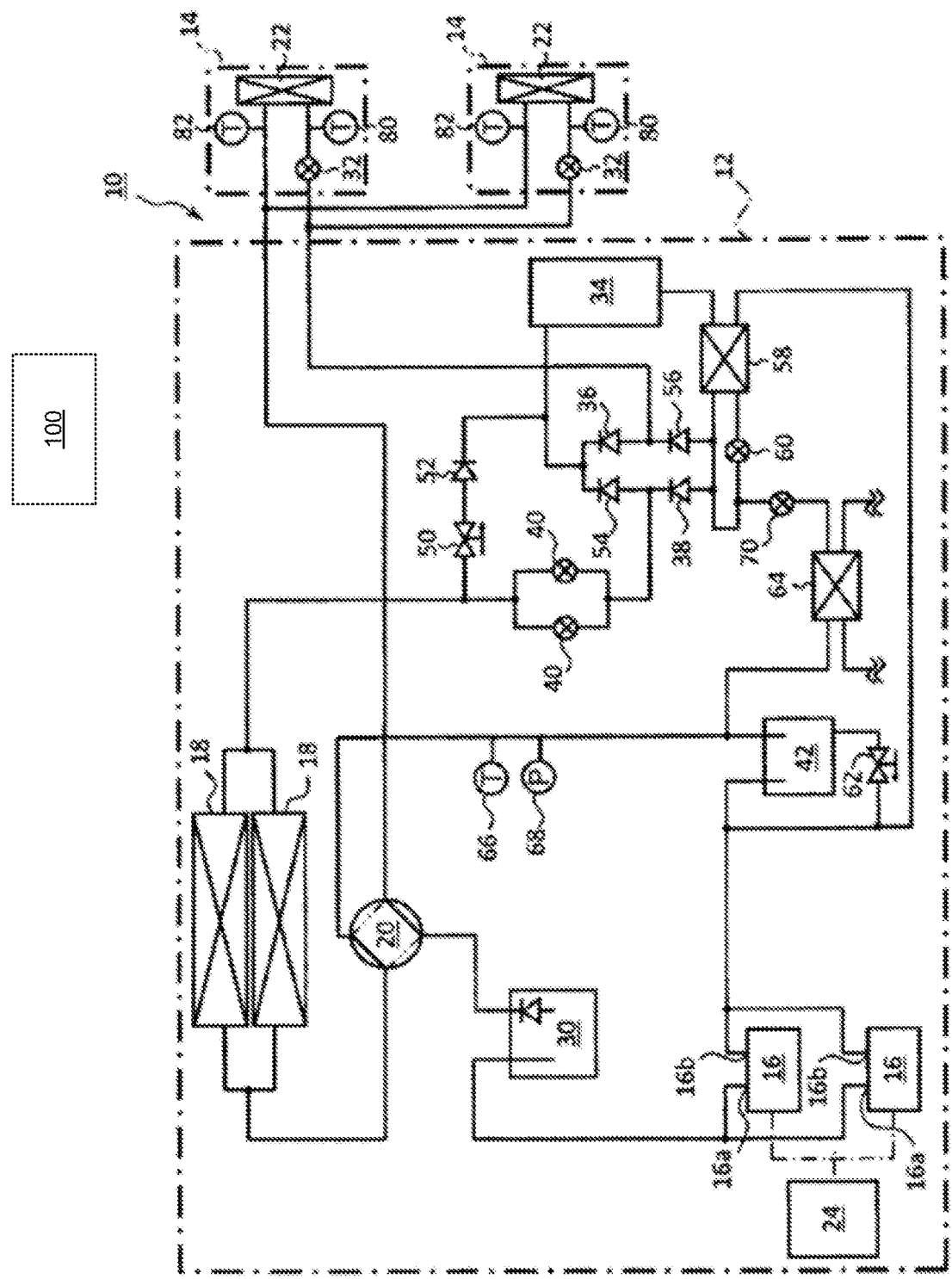

HEAT PUMP

CROSS REFERENCES TO RELATED APPLICATIONS

This application is a national stage application pursuant to 35 U.S.C. § 371 of International Application No. PCT/JP2016/057838, filed on Mar. 11, 2016, which claims priority under 35 U.S.C. § 119 to Japanese Patent Application No. 2015-053176, filed on Mar. 17, 2015, the disclosures of which are hereby incorporated by reference in their entireties.

TECHNICAL FIELD

The present invention relates to a heat pump.

BACKGROUND ART

Traditionally, there has been known a heat pump having an expansion valve whose opening is adjustable for adjusting the flow rate of a refrigerant, in a refrigerant passage between a condenser (first heat exchanger) and an evaporator (second heat exchanger). For example, a heat pump described in Patent Literature 1 (hereinafter, PTL 1) has a thermostatic automatic expansion valve. Such a thermostatic automatic expansion valve adjusts its opening based on the temperature of a refrigerant (degree of superheat) immediately before entering the compressor. This way, the flow rate of the refrigerant passing the expansion valve is maintained constant. Further, PTL 1 also discloses that the thermostatic automatic expansion valve may be replaced with an electronically controlled expansion valve.

CITATION LIST

Patent Literature

PTL 1: Japanese Patent Application Laid-Open No. H4-20749 (1992)

SUMMARY OF INVENTION

Technical Problem

In cases where multiple evaporators are connected to a heat pump, setting the flow coefficient of a channel on the outlet side of the condenser based on the rated capacity causes, at a time of part load operation, an insufficient retention time in the condenser due to a small flow resistance, which leads to a problem that condensing action of the refrigerant is lowered.

However, in cases of the heat pump described in PTL 1, there is no disclosure as to a structure which adjusts the flow coefficient that suits the refrigerant flow rate in the channel on the outlet side of the condenser by controlling the opening of the expansion valve, when the ejection flow rate of the compressor changes (when the rotation speed of the compressor changes) according to a change in the refrigerant flow rate required by the evaporator.

In view of the above, it is an object of the present invention to maintain an optimum condensing pressure and improve a condensing action of a refrigerant in a heat pump, by adjusting a flow coefficient of a channel on an outlet side of a condenser to a suitable value for a refrigerant flow rate, when the refrigerant flow rate required by an evaporator is changed.

Solution to Problem

According to one mode of the present invention to achieve the above technical problems, there is provided a heat pump, including:

a compressor configured to compress and eject a refrigerant;

a first heat exchanger configured to condense the refrigerant from the compressor;

a flow rate adjustment valve configured to adjust a flow rate of the refrigerant condensed in the first heat exchanger;

an expansion valve whose opening is adjustable, which is configured to decompress the refrigerant having passed the flow rate adjustment valve;

a second heat exchanger configured to cool a temperature control target by using the refrigerant decompressed by the expansion valve; and a control device configured to control the opening of the expansion valve based on a difference between the temperature of the refrigerant flowing into the second heat exchanger and the temperature of the refrigerant flowing out from the second heat exchanger, and to control the opening of the flow rate adjustment valve based on the flow rate of the refrigerant to be supplied to the second heat exchanger.

Advantageous Effects of Invention

The present invention enables maintaining of an optimum condensing pressure and improving of a condensing action of a refrigerant in a heat pump, by adjusting a flow coefficient of a channel on an outlet side of a condenser to a suitable value for a refrigerant flow rate, when the refrigerant flow rate required by an evaporator is changed. Further, the degree of supercooling of the condenser can be adjusted according to the operation condition, and the refrigerating cycle can be improved.

BRIEF DESCRIPTION OF DRAWINGS

FIG. 1 is a circuit diagram showing a structure of a heat pump related to one embodiment of the present invention.

DESCRIPTION OF EMBODIMENTS

An embodiment of the present invention will be described hereinbelow with reference to the drawings.

FIG. 1 is a circuit diagram showing a structure of a heat pump related to one embodiment of the present invention. The present embodiment deals with a case where the heat pump is built in an air conditioner. In FIG. 1, solid lines indicate a refrigerant passage (refrigerant pipe) in which a refrigerant flows. Further, the circuit diagram shown in FIG. 1 omits structural elements of the heat pump such as a filter, for the sake of simplicity of description.

As shown in FIG. 1, the heat pump 10 includes: an outdoor unit 12 configured to perform heat exchange with the external air, and at least one indoor unit 14 configured to perform heat exchange with the room air. It should be noted that the present embodiment deals with a case where the heat pump 10 includes two indoor units 14.

The outdoor unit 12 includes: compressors 16 configured to compress and eject a refrigerant; heat exchangers (first heat exchangers) 18; and a four-way valve 20. On the other hand, the indoor units 14 each has a heat exchanger 22 configured to perform heat exchange between the refrigerant and the room air.

The compressors 16 are each driven by a gas engine 24. In the present embodiment, the two compressors 16 and a single gas engine 24 are built in the outdoor unit 12. Further, at least one of the compressors 16 is selectively driven by the single gas engine 24. It should be noted that the driving force that drives the compressors 16 is not limited to the gas engine 24, and may be, for example, a motor, a gasoline engine, and the like.

A high-temperature and high-pressure gaseous refrigerant ejected from an ejection port 16a of at least one of the compressors 16 is directed towards the heat exchangers 18 of the outdoor unit 12 or the heat exchangers 22 of the indoor units 14, by the four-way valve 20. In a heating operation, the gaseous refrigerant ejected from at least one of the compressors 16 is fed to the heat exchanger 22 of at least one of the indoor units 14. In a cooling operation on the other hand, the gaseous refrigerant is fed to the heat exchangers 18 of the outdoor unit 12.

On an ejection channel of the compressors 16, i.e., on the refrigerant passage between the ejection ports 16a of the compressors 16 and the four-way valve 20, there is provided an oil separator 30 which separates oil contained in the refrigerant.

In cases of a heating operation, the high-temperature and high-pressure gaseous refrigerant having been ejected from at least one of the compressors 16 and passed the four-way valve (solid line) 20 is subjected to heat exchange with the room air (temperature adjustment target) in the heat exchanger 22 of at least one of the indoor units 14. That is, heat is moved from the refrigerant to the room air through the heat exchanger 22. As the result, the refrigerant is brought into a low-temperature and high-pressure liquid state.

It should be noted that each indoor unit 14 has an expansion valve 32 whose opening is adjustable. The expansion valve 32 is provided in each of the indoor units 14 so as to be positioned on the refrigerant passage, between the heat exchangers 22 of the indoor units 14 and the heat exchangers 18 of the outdoor unit 12. The refrigerant can pass the heat exchangers 22 of each of the indoor units 14 while the expansion valves 32 are in an open state. While the indoor unit 14 is stopped, its expansion valve 32 is closed.

The outdoor unit 12 is provided with a receiver 34. During the heating operation, the receiver 34 serves as a buffer tank which temporarily store the low-temperature and high-pressure liquid refrigerant after being subjected to heat exchange with the room air in the heat exchanger 22 of at least one of the indoor units 14. The liquid refrigerant flown out from the heat exchanger 22 of at least one of the indoor units 14 passes a check valve 36 and flows into the receiver 34.

During the heating operation, the low-temperature and high-pressure liquid refrigerant in the receiver 34 is fed to at least one of the heat exchangers 18 of the outdoor unit 12. In the refrigerant passage between the receiver 34 and the heat exchangers 18, a check valve 38 and expansion valves 40 are provided. The expansion valves 40 are each an expansion valve whose opening is adjustable. During the heating operation, the opening of each of the expansion valves 40 is adjusted so that the degree of superheat of the refrigerant at an inlet port 16b of at least one of the compressors 16 is a predetermined temperature or higher. It should be noted that the degree of superheat of the refrigerant at the inlet ports 16b is a temperature differential between a saturated steam temperature corresponding to a pressure detected by a pressure sensor 68 and the refrigerant temperature detected by a temperature sensor 66, and is controlled so that the refrigerant temperature detected is at least a predetermined temperature (e.g., 5° C.) higher than the saturated steam temperature. The low-temperature and high-pressure liquid refrigerant having flown out from the receiver 34 is expanded (decompressed) by either one or both of the expansion valves 40 to enter a low-temperature and low-pressure liquid state (mist state).

During the heating operation, the low-temperature and low-pressure liquid refrigerant having passed either one or both of the expansion valves 40 is subjected to heat exchange with the external air, in at least one of the heat exchangers 18 of the outdoor unit 12. That is, the heat is moved from the external air to the refrigerant through at least one of the heat exchangers 18. As the result, the refrigerant is brought into a low-temperature and low-pressure gaseous state.

The outdoor unit 12 is provided with an accumulator 42. During the heating operation, the accumulator 42 temporarily stores the low-temperature and low-pressure gaseous refrigerant after being subjected to heat exchange with the external air in at least one of the heat exchangers 18 of the outdoor unit 12. The accumulator 42 is provided in an inlet channel of the compressors 16 (in the refrigerant passage between the inlet ports 16b of the compressors 16 and the four-way valve 20).

The low-temperature and low-pressure gaseous refrigerant in the accumulator 42 is sucked into at least one of the compressors 16 and compressed. As the result, the refrigerant is turned into a high-temperature and high-pressure gaseous state, and is again fed to the heat exchanger 22 of at least one of the indoor units 14, during the heating operation.

Further, the refrigerant flowing into the accumulator 42 is usually the gaseous refrigerant due to the openings of the expansion valves 40 or the opening of a later-described expansion valve 32. Therefore, an on-off valve 62 is opened in an ordinary air conditioning operation. Then, the on-off valve 62 is closed during a period in which the liquid refrigerant exists while a stopped state, at the early stage of starting, or due to rapid decrease in the air conditioning load, and the like, and the liquid refrigerant is stored in the accumulator 42.

Further, the heat pump 10 has an evaporation assisting heat exchanger 64 which is in parallel to the heat exchangers 18, in the flow of the refrigerant during the heating operation.

In cases where heat exchange by at least one of the heat exchangers 18 alone falls short for the degree of superheat of the refrigerant at the inlet ports 16b to be a predetermined temperature or higher, e.g., when the external air temperature is lower than 0° C., the liquid refrigerant in the receiver 34 is fed towards the evaporation assisting heat exchanger 64. For this reason, an expansion valve 70 whose opening is adjustable is provided between the receiver 34 and the evaporation assisting heat exchanger 64.

A control device (e.g., 100) of the heat pump 10 opens the expansion valve 70 when the degree of superheat of the refrigerant at the inlet ports 16b is a predetermined temperature or lower.

When the expansion valve 70 opens, at least a part of the liquid refrigerant from the receiver 34 flows towards the evaporation assisting heat exchanger 64, and flows through the expansion valve 70 to be turned into low-temperature and low-pressure mist.

The refrigerant in the form of mist having passed through the expansion valve 70 is heated in the evaporation assisting heat exchanger 64 by, for example, high-temperature exhaust gas or cooling liquid for the gas engine 24 (i.e., waste heat of the gas engine 24). This way, the refrigerant in the form of mist having flown into the evaporation assisting heat exchanger 64 through the expansion valve 70 is turned into a high-temperature and low-pressure gaseous state. This high-temperature gaseous refrigerant heated in the evaporation assisting heat exchanger 64 has a higher degree of superheat than the refrigerant passed through at least one of the heat exchangers 18, and flows into the refrigerant passage between the four-way valve 20 and the accumulator 42. This way, the liquid refrigerant contained in the gaseous refrigerant passing through the four-way valve 20 and returning to at least one of the compressors 16 is heated and evaporated (gasified) by the high-temperature gaseous refrigerant from the evaporation assisting heat exchanger 64. As the result, the refrigerant flowing into the accumulator 42 is substantially turned into a gaseous state.

On the other hand, in a cooling operation, the high-temperature and high-pressure gaseous refrigerant ejected from the ejection port 16a of at least one of the compressors 16 moves towards the heat exchangers 18 of the outdoor unit 12 through the four-way valve 20 (two-dot chain line). The refrigerant is then turned into a low-temperature and high-pressure liquid state by being subjected to heat exchange with the external air in at least one of the heat exchangers 18.

The refrigerant flown out from at least one of the heat exchangers 18 passes an on-off valve 50 and a check valve 52 and flows into the receiver 34. It should be noted that this on-off valve 50 is closed during the heating operation.

Further, in some cases during the cooling operation, the refrigerant having flown out from at least one of the heat exchangers 18 passes only the on-off valve 50 and the check valve 52, or additionally passes either one or both of the expansion valves 40 and the check valve 54, and then flows into the receiver 34. This is detailed later.

During the cooling operation, the refrigerant having flown into the receiver 34 passes the check valve 56 and passes the expansion valve 32 of at least one of the indoor units 14. In the cooling operation, the opening of the expansion valve 32 is controlled as hereinafter described, so that the degree of superheat of the refrigerant at the outlet of the heat exchanger 22 is a predetermined value or higher. Passing the expansion valve 32, the refrigerant is decompressed and turned into a low-temperature and low-pressure liquid state (mist state).

The refrigerant having passed the expansion valve 32 passes through the heat exchanger 22 of the indoor unit 14, and is subjected therein to heat exchange with the room air. This way, the refrigerant takes away the heat from the room air (cools the room air). As the result, the refrigerant is turned into a low-temperature and low-pressure gaseous state. Then, the refrigerant having flown out from the heat exchanger 22 passes the four-way valve 20 and the accumulator 42, and then returns to at least one of the compressors 16.

Further, to improve the cooling efficiency, the heat pump 10 has a cooling heat exchanger 58 configured to cool the refrigerant flowing from the receiver 34 to the check valve 56.

The cooling heat exchanger 58 is structured so that heat exchange is performed between the liquid refrigerant flowing from the receiver 34 to the check valve 56 and mist refrigerant; i.e., structured to cool the liquid refrigerant with the mist refrigerant. This mist refrigerant is a part of the liquid refrigerant flowing from the cooling heat exchanger 58 to the check valve 56, which is turned into the form of mist (decompressed) by the expansion valve 60. This expansion valve 60 is a valve whose opening is adjustable for the purpose of selectively performing cooling of the liquid refrigerant by the cooling heat exchanger 58.

When the control device (e.g., 100) of the heat pump 10 controls the expansion valve 60 so that the expansion valve 60 at least partially opens, the liquid refrigerant having passed the cooling heat exchanger 58 yet to pass the check valve 56 partially passes the expansion valve 60 to turn into mist (decompressed). The refrigerant having turned into the mist through the expansion valve 60 flows into the cooling heat exchanger 58, and then takes away the heat from the liquid refrigerant from the receiver 34 which is yet to pass the check valve 56, and gasify the refrigerant. As the result, the liquid refrigerant with a lower temperature as compared to the state where the expansion valve 60 is closed flows into the heat exchanger 22 of at least one of the indoor units 14.

On the other hand, the gaseous refrigerant having taken away the heat from the liquid refrigerant from the receiver 34 yet to pass the check valve 56 is directly returned from the cooling heat exchanger 58 to at least one of the compressors 16.

In the above, structural elements of the heat pump 10 in relation to the refrigerant are schematically described. Hereinafter, control of the heat pump 10 in a cooling operation is further described.

As shown in FIG. 1, the plurality of indoor units 14 each has temperature sensors 80, 82 which detect the temperature of the refrigerant. Each of the temperature sensors 82 detects the temperature of the refrigerant on the downstream side of the corresponding indoor unit 14 relative to the heat exchanger 22, in the cooling operation; i.e., detects the temperature of the refrigerant flowing out from the heat exchanger 22.

The control device of the heat pump 10 controls the opening of the expansion valve 32 of the indoor unit 14, so that the refrigerant temperature detected by the temperature sensor 82 is at least a predetermined temperature (e.g., 5° C.) higher than the saturated steam temperature corresponding to the pressure detected by the pressure sensor 68.

Further, the following describes control of the opening of each of the expansion valves 40 which is performed by the control device of the heat pump 10 during the cooling operation, based on the flow rate of the refrigerant to be supplied to the heat exchanger 22 of the indoor unit 14.

Here, either one or both of the expansion valves 40 is/are selected in such a manner that the flow coefficient is suitable for the refrigerant flow rate of a rated cooling operation. The rated cooling operation is, for example, a state in which cooling operation is requested to all the connected indoor units 14, where the external air temperature of 35° C.

As described, while either one or both of the expansion valves 40 is/are selected, if the external air temperature is lower (e.g. 30° C.) than the set temperature of the rated operation or if the number of indoor units 14 to which the cooling operation is requested is less than the total number of indoor units 14, the control device of the heat pump 10 reduces the refrigerant flow rate by reducing the number of in-operation compressors 16 and their rotation speeds to be smaller than those in the rated operation.

At this point, when either one or both of the expansion valves 40 is/are fully opened, the passage resistance is too small for maintaining an optimum condensing pressure, which may lead to insufficient condensation. In view of the problem, the control device of the heat pump 10 reduces the openings of the expansion valves 40 according to the number of in-operation compressors 16 and their rotation speeds. For example, where the opening(s) of either one or both of the expansion valves 40 is/are 100% during the rated operation, the performance is lowered with a decrease in the amount of circulated refrigerant, because the optimum condensing pressure is not maintained, and therefore, the opening(s) of either one or both of the expansion valves is/are reduced to an optimum level for the refrigerant flow rate, according to the number of in-operation compressors 16 and their rotation speeds.

As described, during the cooling operation, by controlling the openings of the expansion valves 40 based on the refrigerant flow rate supplied to the heat exchanger 22 of the indoor unit 14 (based on the number of in-operation compressors 16 and their rotation speeds), i.e., by having the expansion valves 40 functioning as a flow rate adjustment valve, an optimum condensing pressure is maintained, and the condensing action of the refrigerant can be improved. Further, the degree of supercooling of the condenser can be adjusted according to the operation condition, and the cooling efficiency of the heat pump 10 can be improved.

Thus, the present invention is described with reference to the above-mentioned embodiment; however, the embodiment of the present invention is not limited to such an embodiment.

For example, in the above-mentioned embodiment, the expansion valves 40 function as a decompression valve for decompressing the refrigerant during the heating operation, and function as a flow rate adjustment valve for adjusting the refrigerant flow rate during the cooling operation. However, the embodiment of the present invention is not limited to this.

For example, a refrigerant passage bypassing the expansion valves 40 may be provided, and a flow rate adjustment valve and an on-off valve may be provided to the bypass passage. This way, during the cooling operation, the flow rate of refrigerant to be supplied to multiple indoor units 14 may be adjusted by the flow rate adjustment valve in the bypass passage, without a use of the expansion valves 40.

Further, for example, in the above-mentioned embodiment, the heat pump 10 is an air conditioner configured to perform temperature control of the room air as the temperature control target; however, the embodiment of the present invention is not limited to this. The heat pump related to the embodiment of the present invention may be, for example, a chiller that controls the temperature of water by a refrigerant. In such a case, there is provided water/refrigerant heat exchanger instead of the heat exchanger 22 of the indoor unit 14. Thus, a heat pump of the present invention, in a broader scope, includes: a compressor configured to compress and eject a refrigerant; a first heat exchanger configured to condense the refrigerant from the compressor; a flow rate adjustment valve configured to adjust a flow rate of the refrigerant condensed in the first heat exchanger; an expansion valve whose opening is adjustable, which is configured to decompress the refrigerant having passed flow rate adjustment valve; a second heat exchanger configured to cool a temperature control target by using the refrigerant decompressed by the expansion valve; and a control device e.g., 100) configured to control the opening of the expansion valve based on a difference between the temperature of the refrigerant flowing into the second heat exchanger and the temperature of the refrigerant flowing out from the second heat exchanger, and to control the opening of the flow rate adjustment valve based on the flow rate of the refrigerant to be supplied to the second heat exchanger.

The present invention is applicable to a heat pump including an expansion valve whose opening is adjustable, between two heat exchangers.

Preferred embodiments of the disclosure are thus sufficiently described with reference to attached drawings; however, it is obvious for a person with ordinary skill in the art to which the present invention pertains that various modification and changes are possible. Such a modification and changes, unless they depart from the scope of the present invention as set forth in claims attached hereto, shall be understood as to be encompassed by the present invention.

The entire disclosure of the specification, drawings, and claims of Japanese patent application No. 2015-53176 filed on Mar. 17, 2015 is incorporated in this specification by reference.

REFERENCE SIGNS LIST

10 heat pump
16 compressor
18 first heat exchanger
22 second heat exchanger
32 expansion valve
40 flow rate adjustment valve (expansion valve)

The invention claimed is:

1. A heat pump comprising:
a plurality of compressors, each compressor of the plurality of compressors configured to compress and eject a refrigerant;
a first heat exchanger configured to receive and condense the refrigerant from the plurality of compressors;
a first flow rate adjustment valve configured to adjust a flow rate of the refrigerant condensed by the first heat exchanger;
a first expansion valve positioned downstream of the first flow rate adjustment valve and that has an opening that is adjustable, the first expansion valve configured to decompress the refrigerant that passes through the opening;
a second heat exchanger configured to receive and cool a first temperature control target using the refrigerant decompressed by the first expansion valve;
a receiver configured to store a liquid refrigerant, the receiver provided between the first heat exchanger and the second heat exchanger;
a pressure sensor configured to detect a pressure of the refrigerant in an inlet channel associated with the plurality of compressors; and
a controller configured to:
for the pressure detected by the pressure sensor, adjust the opening of the first expansion valve such that a temperature of refrigerant that flows from the second heat exchanger is at least a predetermined temperature higher than a saturated steam temperature for the refrigerant at the pressure detected by the pressure sensor; and
control an opening of the first flow rate adjustment valve according to:
a number of in-operation compressors of the plurality of compressors; and a corresponding rotation speeds of each of the in-operation compressors;
wherein:
the first flow rate adjustment valve is provided between the first heat exchanger and the receiver; and
the first expansion valve is provided on a downstream side of the receiver.

2. The heat pump of claim 1, further comprising a second flow rate adjustment valve positioned in parallel with the first flow rate adjustment valve.

3. The heat pump of claim 2, wherein the controller is further configured to control an opening of the second flow rate adjustment valve according to the number of in-operation compressors of the plurality of compressors and the corresponding rotation speeds of each of the in-operation compressors.

4. The heat pump of claim 3, wherein the controller is further configured to, in response to an external air temperature being less than a set temperature of the first temperature control target:
reduce the number of in-operation compressors and the corresponding rotation speeds of each of the in-operation compressors to reduce the flow rate of the refrigerant; and
reduce an opening of the first flow rate adjustment valve such that an optimum condensing pressure is maintained based on the reduced flow rate of the refrigerant.

5. The heat pump of claim 4, wherein the controller is further configured to:
select the first flow rate adjustment valve, the second flow rate adjustment valve, or both the first and second flow rate adjustment valves; and
reduce the opening of the selected flow rate adjustment valve to maintain a predetermined pressure of the refrigerant.

6. The heat pump of claim 5, wherein the controller is further configured to adjust the opening of the selected flow rate adjustment valve in response to the pressure sensor detecting the pressure of refrigerant being less than or equal to the predetermined pressure.

7. The heat pump of claim 4, wherein the controller is further configured to control an opening of the first and second low rate adjustment valves to maintain the pressure of the refrigerant flowing from the second heat exchanger.

8. The heat pump of claim 2, further comprising:
a second expansion valve positioned downstream of the first and second flow rate adjustment valves, the second expansion valve comprising an opening that is adjustable and configured to decompress the refrigerant that passes through the opening; and
a third heat exchanger configured to receive and cool a second temperature control target using the refrigerant decompressed by the second expansion valve; and
wherein the controller is further configured to:
adjust the opening of the second expansion valve such that a temperature of refrigerant that flows from the third heat exchanger is at least a predetermined temperature higher than the saturated steam temperature for the refrigerant at the pressure detected by the pressure sensor.

9. The heat pump of claim 8, further comprising:
a first temperature sensor positioned upstream from the second heat exchanger;
a second temperature sensor positioned downstream from the second heat exchanger; and
a third temperature sensor positioned between the second temperature sensor and the plurality of compressors in a flow path of the refrigerant.

10. The heat pump of claim 9, wherein the second temperature sensor is configured to determine the temperature of refrigerant that flows from the second heat exchanger.

11. The heat pump of claim 10, further comprising:
an accumulator positioned downstream of the second heat exchanger; and
wherein the accumulator is positioned between the pressure sensor and the plurality of compressors in the flow path of the refrigerant.

12. The heat pump of claim 11, further comprising:
a cooling heat exchanger positioned between a receiver and a check valve in the flow path of the refrigerant, the cooling heat exchanged configured to cool the refrigerant flowing from the receiver to the check valve; and
a cooling valve; and
wherein the controller is further configured to control an opening of the cooling valve so that the refrigerant flowing between the cooling heat exchanger and the check valve turns into mist before entering the cooling heat exchanger.

13. The heat pump of claim 12, further comprising an oil separator positioned between the plurality of compressors and the first heat exchanger in the flow path of the refrigerant.

14. The heat pump of claim 1, further comprising:
a cooling valve; and
a cooling heat exchanger configured to cool the refrigerant; and
wherein the controller is further configured to control an opening of the cooling valve so that the refrigerant flowing into the cooling heat exchanger turns into mist before entering the cooling heat exchanger.

15. The heat pump of claim 1, wherein the controller is further configured to control the opening of the first flow rate adjustment valve to maintain the pressure of the refrigerant in the inlet channel.

16. A heat pump comprising:
a plurality of compressors, each compressor of the plurality of compressors configured to compress and eject a refrigerant;
a first heat exchanger configured to receive and condense the refrigerant from the plurality of compressors;
a first flow rate adjustment valve configured to adjust a flow rate of the refrigerant condensed by the first heat exchanger;
a first expansion valve positioned downstream of the first flow rate adjustment valve and that has an opening that is adjustable, the first expansion valve configured to decompress the refrigerant that passes through the opening;
a second heat exchanger configured to receive and cool a first temperature control target using the refrigerant decompressed by the first expansion valve;
a pressure sensor configured to detect a pressure of the refrigerant in an inlet channel associated with the plurality of compressors; and
a controller configured to:
for the pressure detected by the pressure sensor, adjust the opening of the first expansion valve such that a temperature of refrigerant that flows from the second heat exchanger is at least a predetermined temperature higher than a saturated steam temperature for the refrigerant at the pressure detected by the pressure sensor; and
control an opening of the first flow rate adjustment valve according to:
a number of in-operation compressors of the plurality of compressors; and a corresponding rotation speeds of each of the in-operation compressors.

17. The heat pump according to claim 16, further comprising a receiver configured to store a liquid refrigerant, the receiver provided between the first heat exchanger and the second heat exchanger.

18. The heat pump according to claim 17, wherein:
the first flow rate adjustment valve is provided between the first heat exchanger and the receiver;

the first expansion valve is provided on a downstream side of the receiver.

19. A heat pump comprising:

at least one compressor, each compressor of the at least one compressor configured to compress and eject a refrigerant;

a first heat exchanger configured to receive and condense the refrigerant from the plurality of compressors;

a first flow rate adjustment valve configured to adjust a flow rate of the refrigerant condensed by the first heat exchanger;

a first expansion valve positioned downstream of the first flow rate adjustment valve and that has an opening that is adjustable, the first expansion valve configured to decompress the refrigerant that passes through the opening;

a second heat exchanger configured to receive and cool a first temperature control target using the refrigerant decompressed by the first expansion valve;

a receiver configured to store a liquid refrigerant, the receiver provided between the first heat exchanger and the second heat exchanger;

a pressure sensor configured to detect a pressure of the refrigerant in an inlet channel associated with the plurality of compressors; and a controller configured to:

for the pressure detected by the pressure sensor, adjust the opening of the first expansion valve such that a temperature of refrigerant that flows from the second heat exchanger is at least a predetermined temperature higher than a saturated steam temperature for the refrigerant at the pressure detected by the pressure sensor; and control an opening of the first flow rate adjustment valve according to:

a number of in-operation compressors of the plurality of compressors; and a corresponding rotation speeds of each of the in-operation compressors; and wherein:

the first flow rate adjustment valve is provided between the first heat exchanger and the receiver; and the first expansion valve is provided on a downstream side of the receiver.

20. An outdoor unit comprising:

a plurality of compressors, each compressor of the plurality of compressors configured to compress and eject a refrigerant;

a first heat exchanger configured to receive and condense the refrigerant from the plurality of compressors;

a first flow rate adjustment valve configured to adjust a flow rate of the refrigerant condensed by the first heat exchanger;

a receiver configured to store a liquid refrigerant; and a controller configured to control an opening of the first flow rate adjustment valve according to:

a number of in-operation compressors of the plurality of compressors; and a corresponding rotation speeds of each of the in-operation compressors; and wherein the first flow rate adjustment valve is provided between the first heat exchanger and the receiver.

* * * * *